Aug. 7, 1951 R. L. WALLACE, JR 2,563,503

TRANSISTOR

Filed April 29, 1949

INVENTOR
R. L. WALLACE JR.
BY Harry C. Hart
ATTORNEY

Patented Aug. 7, 1951

2,563,503

UNITED STATES PATENT OFFICE 2,563,503

TRANSISTOR

Robert L. Wallace, Jr., Plainfield, N. J., assignor to Bell Telephone Laboratories, Incorporated, New York, N. Y., a corporation of New York Application April 29, 1949, Serial No. 90,533

19 Claims. (Cl. 175—366)

This invention relates to the translation of electric signals and particularly to semiconductor translating devices of improved construction.

A primary object of the invention is to improve the stability of a semiconductor translator.

Another primary object is to increase the input impedance of a semiconductor translating device.

A related object is to improve the operation of a semiconductor translator at high frequencies.

The invention provides specific improvements in the construction and mode of operation of a three electrode semiconductor amplifier of the type which forms part of the subject-matter of an application of John Bardeen and W. H. Brattain, Serial No. 33,466, filed June 17, 1948, now Patent No. 2,524,035, which is a continuation in part of an earlier application of the same inventors Serial No. 11,165, filed February 26, 1948, and later abandoned. This central element comprises a small block of semiconductor material such as germanium having in its original form at least three electrodes electrically coupled thereto, which are termed the emitter, the collector and the base electrode. The emitter and the collector are point contact electrodes making rectifier contact with one face of the block and spaced apart by a few thousandths of an inch, while the base electrode may be a plated metal film making a low resistance contact with the opposite face of the block. The base electrode is thus separated from the emitter and the collector by the full thickness of the block. The emitter may be biased for conduction in the forward direction and in this condition its impedance is a few hundred ohms. On the other hand the collector is biased for conduction in the reverse direction in which case its impedance is several thousand ohms. The forward emitter bias results in the injection of charges into the block through the comparatively low emitter impedance and these charges are transported under the influence of electric fields within the block to the collector where they are withdrawn through the comparatively high collector impedance. The application of a signal current or voltage to the emitter results in variation of the injected charges and so of the charges transported to the collector. The high ratio of the collector impedance to the emitter impedance results in voltage amplification. In addition the transported charges serve to modify the currents flowing from the base to the collector so that current amplification results as well. Due to either or both phenomena amplified versions of the voltage, current, and power of the original signal appear in the load. The device, which may take various forms has received the appellation "Transistor" and will be so designated in the present specification.

In a modified transistor described in an application of W. E. Kock and R. L. Wallace, Jr., filed August 19, 1948, Serial No. 45,023, now Patent No. 2,560,579, the block takes the form of a disc into opposite faces of which hemispherical depressions have been ground to depth such that the block thickness, at its thinnest part, is only a few thousandths of an inch. The emitter makes point contact at the low point of one of the depressions and the collector makes point contact substantially colinearly with the emitter, at the low point of the opposite depression. The base electrode makes low resistance contact with the peripheral surface of the disc. The base is thus separated from the other electrodes by the full radius of the disc.

For some purposes it is desirable to introduce a time delay between the introduction of signal at the emitter and its recovery from the collector. To this end the transistor may be drawn out an elongated filament on which the emitter and the collector make point contact at widely spaced points. In place of a single base electrode there are now two low resistance electrodes, one at each end, the emitter making contact with the filament near the one and the collector making contact with the filament near the other. In particular, the low resistance end electrodes may be metal annuli on the end faces of the filament, the point electrodes protruding through the holes in these annuli. Certain features of this elongated transistor form the subject-matter of an application of G. L. Pearson and W. Shockley, Serial No. 50,897, filed September 24, 1948, now Patent No. 2,502,479, while certain other features form the subject-matter of an application of J. R. Haynes and W. Shockley, Serial No. 50,894, filed September 23, 1948.

The performance of transistors is conveniently described in terms of an equivalent four terminal network comprising an emitter resistance $r_e$, a base resistance $r_b$, a collector resistance $r_c$, and an internal electromotive force which is proportional to the emitter current. In this network the base resistance is common to the input circuit and the output circuit and is therefore a source of feedback which, if sufficiently great, makes for instability and in any event reduces the effective input impedance of the device. To this extent the base resistance is objectionable.

Transistors of the close-spaced electrode variety are characterized in general by base resistances of the order of 100–500 ohms, which, in comparison with the usual values of emitter resistance, which are of the order of 300–800 ohms, is sufficiently high to be objectionable. In transistors of the elongated filament variety, it has been possible to reduce this base resistance somewhat by increasing the proximity of the emitter to the base; but such elongated transistors are not of general application because, especially at high frequencies, their long transit times impose an upper frequency limit to successful operation which is objectionably low.

Accordingly, it is a subsidiary or intermediate object of the present invention to reduce the base resistance of transistors of the close-spaced electrode variety. This object is attained, in accordance with the invention, by a departure from the conventional transistor construction in which, while the collector and the emitter are located in close proximity to each other, each of these electrodes is separated by a relatively large distance from the base electrode. In contradistinction to this conventional construction, the present invention brings the emitter as close to the base electrode as it is possible to do without making direct contact therewith. The new construction has resulted in base resistances of the order of 10 to 20 ohms and consequently greatly improved stability and input impedance. With this construction the high resistance barrier, whose existence between the base electrode and the emitter electrode is believed to characterize transistors of all configurations, may no longer merely lie below one surface of the semiconductor block and parallel to it, as described in the aforementioned application of J. Bardeen and W. H. Brattain, but should rather intersect the block surface between the emitter and the base electrode. This barrier, located in this fashion, operates to maintain a high value of the emitter resistance of which the principal component part resides in the spreading resistance immediately under the emitter contact, and so enables the emitter electrode to support the applied signal voltage while still controlling the flow of collector current. In other words, the construction of the invention makes for a low base resistance without a corresponding or proportional reduction in the emitter resistance whose magnitude must not be too small.

The invention will be fully apprehended from the following detailed description of preferred embodiments thereof, taken in conjunction with the appended drawings in which.

Figure 1:
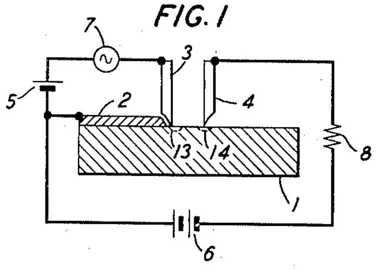
Fig. 1 is a schematic diagram, partly in section, of an amplifier embodying a transistor in accordance with the invention.

Referring now to the drawings, Fig. 1 shows a transistor comprising a block 1 of semiconductor material such as high back voltage germanium which may be prepared as described in "Crystal Rectifiers" by H. C. Torrey and C. A. Whitmer (McGraw-Hill, 1948). On one part of the upper face of this block there is provided, for example by evaporation of an inert metal such as rhodium in a vacuum, a metal film 2 which makes low resistance contact with that part of the semiconductor block which lies immediately below it. In the complete transistor, this film serves as the base electrode. The remainder of the upper surface of the block, or at least a suitable fractional part thereof, is otherwise treated in such a way that when metallic point contact electrodes are engaged with it and suitable electroforming processes are applied to them, these contacts will exhibit rectifier characteristics. A suitable surface treatment for this purpose is to etch the upper face of the block with a solution which contains 10 parts by volume of concentrated nitric acid, 5 parts of commercial standard (50 per cent) hydrofluoric acid and 10 parts of water, in which a small amount, e. g. 0.2 gram of copper sulphate has been dissolved. The proportions of the etchant are not particularly critical and may be varied over a considerable range. The germanium material is etched with this solution by immersion therein for a period of about 1 minute, although the etching time is not particularly critical, but lies in the range from 15 seconds to 10 minutes. Throughout the etching process the base electrode may be protected from corrosion by the etchant by a coating of wax or otherwise as desired. Immediately upon removal from the etching solution the semiconductor block is washed in a brisk flow of cold tap or distilled water for a period from several seconds to 2 minutes. The block is then immediately dried in a strong air blast. An alternative drying procedure is to rinse the block, after washing, in methyl alcohol and then in acetone and to dry it in still air or an air blast. It is important that the step of washing in water be carried out as described because it results in a high reverse impedance and a high maximum reverse voltage at the rectifying junctions which are formed when the point contact electrodes are engaged with the block. These characteristics are particularly important at the collector electrode.

The treated surface of the block, prior to treatment, is preferably ground or even polished. It has been found that the greatest sensitivity of the treated surface is achieved by thoroughly smoothing the surface before etching. The roughness of the unetched surface is a factor in determining the sensitivity which results from etching, a smooth surface becoming more sensitive in the course of the etching process than a rough one.

When the grinding, etching, washing and drying have been completed, point electrodes of metal such as Phosphor bronze may be brought into contact with the sensitized surface. One of these, 3, termed the emitter, is now ready for action. The other, 4, termed the collector, is preferably subjected to an electric forming process in order to reduce its resistance to reverse current. This electric forming process involves the application of a voltage to the collector electrode in the reverse direction and of a magnitude sufficient to exceed the peak value of the rectifier back voltage, the electrode meanwhile being protected from injury by the inclusion of a resistor in circuit.

Figure 2:
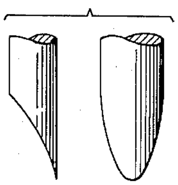
Fig. 2 shows two mutually perpendicular side views of a point contact electrode of preferred form.
Figure 3:
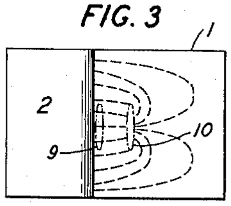
Fig. 3 is a plan view of the upper face of the transistor of Fig. 1, with current streamlines indicated.

In accordance with the present invention, the emitter electrode 3 is placed as close to the base electrode 2 as is mechanically possible. To this end the emitter electrode may be a wire of circular cross-section and about 1 mil in diameter and it may be sharpened to a chisel edge having a configuration which in one aspect is shown at the left in Fig. 2 and in a perpendicular aspect is shown at the right. The resulting point lies in the plane of one side of its shank as also shown in Fig. 1, and is of such a shape that when it is brought into engagement with the sensitized semiconductor surface the resulting minute area of contact is elliptical in form. This permits the contact to be made with the bevelled portion of the chisel edge of the wire electrodes 3 overhanging the edge of the base electrode 2, so that the major axis of the minute contact area lies parallel with the edge of the base electrode, as illustrated in Fig. 3. When the collector electrode 4 is similarly shaped, the two point contact electrodes 3, 4, may be brought as close together as desired without making mutual contact, while the minor axis of the minute area over which the emitter 3 makes contact with the sensitized surface and the separation distance between this area and the base electrode may be held as low as a few tenths of a mil; i. e., less than the diameter of the shank of the point contact electrode 3. Specifically, while the major axis of the contact area may be one mil in length, its minor axis may be about 0.1 mil and the distance separating this area from the base may be about 0.2 mil.

An electric connection is now made to each of the three electrodes, as by soldering. A work bias of a fraction of a volt, derived from a source such as a battery 5, is applied to the emitter and a bias of 40 to 100 volts derived from a source such as a battery 6 is applied to the collector 4. When the material of the semiconductor block 1 is N-type germanium the sign of the emitter bias is positive and that of the collector bias is negative. With material of opposite type, such as P-type silicon, the signs of these bias voltages are to be reversed.

When a signal source 7 is connected between the base electrode and the emitter and a load is connected between the base electrode 2 and the emitter 3, it is found that amplified versions of the signal of the source appear in a load 8 connected between the collector 4 and the base 2; and that, furthermore, the problems of instability and of low effective input impedance which have characterized other transistors are absent with the transistor of the invention.

Fig. 3 is a plan view of the surface of the semiconductor block 1 of Fig. 1 in the plane of its surface, showing the minute elliptical areas 9, 10, over which the emitter and the collector make contact with the surface of the block, and showing the base electrode 2 which lies exceedingly close to the emitter 3. When current flows between the base electrode 2 and the collector 4, the emitter being open-circuited, the current streamlines follow paths such that their traces on the surface of the block are approximately as indicated in the figure by broken lines. The total voltage drop along any one of these streamlines is evidently equal to the voltage difference between the base electrode 2 and the collector 4. As the collector current is changed, the potential of each part of the block surface changes, but the potential of that part at which the emitter electrode 3 makes contact undergoes only a very small change. This change is very small for two reasons. First, it is spaced along the central streamline from the base electrode to the collector only by a fraction of the length of this line; and second, the voltage drop per unit length of any streamline is less near the base where the streamlines are spread apart and greatest near the collector where they are gathered close together. For both reasons, therefore, a change in the collector current results in a comparatively small change in the open circuit emitter voltage.

From the foregoing explanation it is clear that the major axes of the elliptical areas 9, 10, may be extended laterally as far as desired; until, indeed, their lengths become equal to the width of the block 1.

Figure 4:
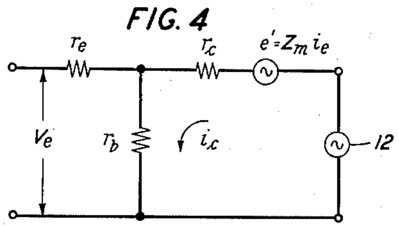
Fig. 4 is a schematic diagram of the equivalent network of a transistor.

Fig. 4 shows an equivalent network for a transistor. As fully explained in H. L. Barney Patent 2,550,518, this equivalent network has been found to be of assistance in describing and analyzing the operation of transistors. Here, $r_e$ represents the emitter resistance, $r_c$ represents the collector resistance and $r_b$ represents the base resistance, while the amplification features of the transistor are represented by the inclusion of a fictitious generator of electromotive force $e'=z_m i_e$, where $i_e$ is the emitter current and $z_m$ is termed the mutual impedance of the transistor.

When, as indicated in Fig. 4, an external signal source 12 is applied between the base 2 and the collector 4, the emitter 3 being left on open circuit, the only current which flows is the collector current $i_c$. It is also apparent that under these conditions the open circuit voltage $V_e$ measured between the base and the emitter is equal to the voltage drop across the base resistance $r_b$. Hence, the condition that the potential of the emitter shall remain nearly equal to the potential of the base despite changes in the collector current as described above in connection with Fig. 2, is equivalent to the condition that the base resistance $r_b$ be small. This is the result produced by the structure of the invention.

At the same time, in order that the device shall operate efficiently as a transistor, it is necessary that the emitter resistance $r_e$ in Fig. 4 be of substantial magnitude. The fabrication technique described above gives this result. Without necessary subscription to any particular theory of operation, it is believed that the reason for this is that there exists, immediately below the minute area of contact of each of the point contact electrodes, a high resistance barrier indicated by the broken lines 13, 14 in Fig. 1, and that the emitter barrier 13 reaches the exposed surface of the block 1 somewhere in the minute region between the edge of the base electrode 2 and the emitter contact area 9, as likwise indicated on the figure. On one side of this barrier the material is believed to be of one conductivity type, for example, excess or N-type conductivity, while on the other side of the barrier the material is believed to be of the opposite type, namely, deflect or P-type conductivity. In any event it is clear that the principal part of the emitter resistance resides in the spreading resistance in a minute hemispherical volume of the semiconductor material immediately under the emitter contact.

It is of minor importance whether or not the barrier extends unbroken from some point to the left of the emitter electrode 3 to some other point to the right of the collector electrode 4, or whether, as indicated on the figure, the emitter and the collector make contact with individual "islands" of P-type material, each of which is individually separated by a barrier from the body of the block of N-type material. Advantageously low values of base resistance are achieved by the close spacing between the emitter 3 and the base 2 without a corresponding or proportionate diminution of the emitter resistance $r_e$.

Figure 5:
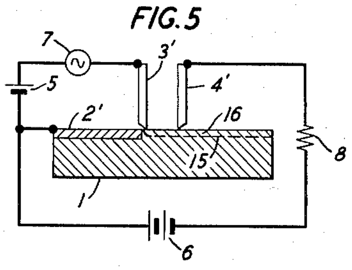
Fig. 5 is a schematic diagram of a modification of Fig. 1.

Fig. 5 shows a modification in which the base electrode 2' is fitted into a space provided for it in the upper face of the semiconductor block 1 so that its surface lies flush with that of the block. With this construction the beveled edge of the emitter electrode 3' may be more oblique, and so mechanically stronger. Fig. 5 also shows a barrier 15 which extends unbroken from below the emitter 3' to below the collector 4' separating a surface layer 16 of material of one conductivity type, for example P-type, from the main body of the block which may be of opposite conductivity type, and from the base electrode 2'. Such a block may be constructed by first treating a part of the upper face of a block of N-conductivity type material to convert a surface layer to P-conductivity type material, separated from the main body of the block by a high resistance barrier, another part of the face meanwhile being masked against the treatment, then removing the material of the block from the masked part of its face and finally inserting the base electrode in the space so formed.

The P-conductivity type layer and the barrier below it may be formed over the required part of the block surface in any desired manner, the remainder of the surface being protected by a suitable mask. One suitable process which forms the subject-matter of an application of R. B. Gibney, Serial No. 11,167, filed February 26, 1948, now Patent No. 2,560,792, comprises the anodic oxidation of the surface in an electrolyte such as polymerized glycol borate, the surface having previously been prepared by etching. The applied voltage may be increased up to about 100 volts over a period of an hour or so. The face of the block is then cleansed of oxides which may have formed. The barrier-layer depth resulting from this process appears to be about $10^{-4}$ centimeters. Another process comprises bombarding the face of the block with nuclear particles such as deuterons or alpha particles. The effects of such bombardment are described in an application of G. L. Pearson and W. Shockley, Serial No. 87,618, filed April 15, 1949. This process results in the formation of a well-defined barrier at a depth below the surface which depends on the energy imparted to the impinging particles. With alpha particles of 5.3 m. e. v. energy derived from a radioactive source, barriers have been formed at a depth of 0.8 mil. With 8.5 m. e. v. deuterons accelerated by a cyclotron, barriers have been formed at a depth of 5 mils.

After formation of the surface layer and the barrier, the semiconductor material is removed from a part of the surface and to a depth in excess of the depth of the barrier. This removal may be carried out by grinding, sandblasting, or otherwise. In the case of sandblasting, the P-conductivity layer to be preserved may be protected from the blast by a mask of plastic or the like. Lastly, the base electrode 2' may be applied to the ground or etched surface by evaporation of a metal such as rhodium.

Figure 6:
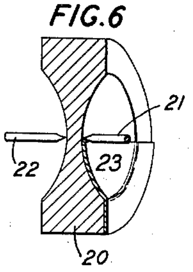
Figs. 6 and 7 are perspective diagrams illustrating modified forms of the invention.

Fig. 6 is a perspective diagram, partly in section, of a transistor of the coaxial type which is modified in accordance with the present invention. Here the transistor takes the form of a disc 20 of semiconductor material into opposite faces of which hemispherical depressions are formed as by grinding, and of a depth such that the bases of these depressions approach within a few mils of each other. Metal electrodes 21, 22 serving as emitter and collector, respectively, make contact in alignment with each other at the bases of these depressions. Transistors of this modified configuration form the subject-matter of the aforementioned application of W. E. Kock and R. L. Wallace, Jr. In that application the base electrode was provided by a band or film of metal which encircled the cylindrical surface of the disc. In accordance with the present invention, however, a substantial area of one face of the disc is provided with a metal film 23 which constitutes the base electrode and the remaining portion of the surface of this face is suitably treated as with the etching and washing process described above. The emitter 21 may be a point contact electrode which engages the treated surface close to the edge of the metal film 23, e. g., spaced from this edge by not more than twice the diameter of the emitter contact area, while the collector electrode 22 engages the disc in the center of the oppositely located depression and in collinear alignment with the emitter.

Figure 7:
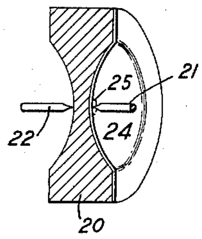

Fig. 7 shows another modification in which the entire surface of one face of the disc 20 is provided with a metal film 24 serving as the base electrode with the exception of a minute hole 25 at the base of the depression through which the surface of the semiconductor material is exposed. This exposed surface is then suitably treated as by the etching and washing process and a metal point electrode 21 serving as the emitter makes point contact directly with the sensitized semiconductor surface exposed through this hole. The diameter of the hole is preferably not more than twice the diameter of the emitter contact area. As before, the collector electrode 22 makes contact at the center of the oppositely located depression, and preferably in axial alignment with the emitter electrode.

As an alternative to the fabrication technique described in connection with Fig. 1, a modified technique may be employed to produce the structure of Fig. 7, as follows: The metal point contact electrode which is to serve as the emitter is first covered with a thin coat of insulating material such as wax. The surface of the semiconductor block is then treated with the etching, washing and drying process to sensitize it. Next, the wax-coated electrode is pressed into contact with this sensitized surface. The surface is then sandblasted and plated with an inert metal such as rhodium to serve as the base electrode. The wax coating of the emitter electrode, and especially that portion of it which at first covered the metal point and which, in the course of pressing the point into engagement with the semiconductor surface is forced radially outward, operates to protect a minute area surrounding the emitter, both from the sandblast and from the deposition of the metal in the plating process. As before, a barrier surrounding the point of engagement of the emitter with the semiconductor material is believed to exist and to define a minute island zone of P-type material immediately below the emitter and smaller in diameter than the hole in the metal plating, thereby holding the emitter spreading resistance to a substantial value, while giving advantageously low values of the base resistance.

Figure 8:
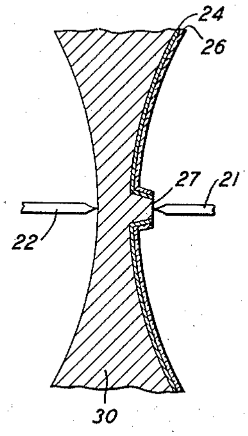
Fig. 8 is an enlarged sectional view of a portion of a transistor embodying the invention in another form.

Fig. 8 shows a cross-section of a portion of a transistor having still another configuration leading to low base resistance. The portion shown is the central part of a transistor of the coaxial type described in the aforementioned application of W. E. Kock and R. L. Wallace which, however, has been modified by the formation of a minute boss 27 at the center of one of the depressions.

Figure 9:
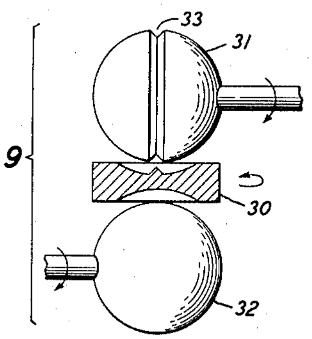
Fig. 9 is a diagram illustrating a step in the fabrication of the transistor of Fig. 7.

Such a minute boss may conveniently be formed in the course of grinding the depression. Referring to Fig. 9, a block of semiconductor material is indicated as being rotated about a vertical axis while two spherical grinding tools 31, 32 are shown as rotating about horizontal axes above and below the semiconductor block. The upper grinding tools 31 is provided with a circular groove 33. Evidently, as all three members are brought into contact and rotated, hemispherical depressions are ground into the semiconductor block while a minute boss 27 is left in the center of the upper depression.

The entire upper surface of the block 30 may now be sandblasted and plated with a film 24 of suitable metal such as rhodium. This plated surface may now be covered with a thin film 26 of protective plastic material such as polystyrene. Next, with a grinding tool of smaller diameter than the depression, the base of the depression is ground until both the protective plastic film 26 and the metal film 24 below it are removed from the central boss 27, and the boss is exposed. This small exposed surface may now be subjected to the etching treatment above described to sensitize it, the remainder of the face of the disc being protected from the etchant by the protective plastic film 26. Next, the protective plastic film may be removed from any convenient portion of the outer part of the disc to expose the metal film 24 and a base connection may then be soldered to the latter. Finally, an emitter point contact 21 of suitable metal such as Phosphor bronze is brought into engagement with the small exposed portion of the semiconductor material while a collector point contact 22 is engaged with the bottom of the oppositely located depression and preferably in axial alignment with the emitter electrode.

Figure 10:
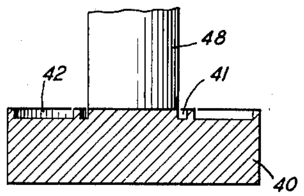
Figs. 10 and 11 are a side view and a plan view, respectively, of another modification.
Figure 11:
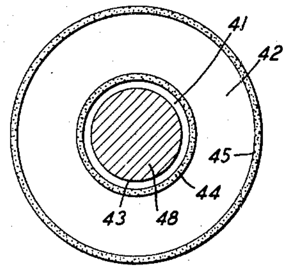
Figure 12:
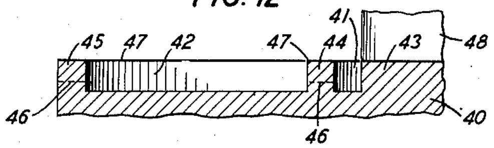
Fig. 12 is an enlarged sectional view of a part of Fig. 10.

The invention is not restricted to transistors employing point contacts but is equally applicable to structures in which transistor action takes place by virtue of barriers within the semiconductor material comprising junctions between zones of N-type conductivity and zones of P-type conductivity. Transistors of this character are described in an application of W. Shockley, Serial No. 35,423, filed June 26, 1948, and also in the aforementioned application of G. L. Pearson and W. Shockley. Application of the present invention to what may be termed a "junction transistor" gives rise to various structures, one of which is illustrated in Figs. 10, 11, and 12. Here Figs. 10 and 11 are a sectional view and a plan view, respectively, of a junction transistor to which the invention has been applied, while Fig. 12 is a greatly enlarged cross-sectional view of a part of Fig. 10. Referring to these figures, the semiconductor block may take the form of a disc 40 in one surface of which two concentric annular depressions have been cut, the inner one 41 exceedingly narrow, i. e., one mil or less, and the outer one 42 wider, for example 5–10 mils. The depth of these depressions has been exaggerated in the figures.

These two annular depressions define three raised portions: a central one 43, a first ring 44 close to it and a second ring 45 further away. Each raised portion is provided with a film of metal, such as rhodium, to which electrical connections may be soldered. The material of the inner and outer rings is of conductivity type opposite to that of the remainder of the block, and the junction of the two materials operates in each case as a high resistance barrier 46. There is no such barrier below the central raised portion 43 of the block.

The block of Figs. 10, 11 and 12 may be fabricated in the following manner. A block of N-type high back voltage germanium in the form of a disc is first sandblasted. Next, one sandblasted face is plated with a film 47 of metal such as rhodium. A small brass rod 48 is then soldered to the metal film 47 at the center of the plated side of the disc 40. This rod protects the central part of the disc from the treatment which follows and eventually serves as the base electrode connection. The plated face is now subjected to a nuclear bombardment process of the type described above, which appears to convert a surface layer of the semiconductor material into P-type germanium, separated from the body of the N-type material by a well-defined high resistance barrier 46 lying at a depth of from 0.5 to 5 mils, depending on the energy of the impinging particles. The metal film 47 which covers the block face is freely permeable to the bombarding particles but the central part of the block is protected by the soldered brass rod 48.

Annular depressions are now formed as with a circle saw, the inner one 41 very narrow and the outer one 42 wider. In each case the depth of the cut should exceed the depth at which the barrier 46 lies. With a barrier-layer depth of 0.01 cm., a depth of 10 mils for the cut is sufficient. Finally, and as a precaution against deterioration, the surfaces of the semiconductor material on which there are exposed P-N junctions are etched, the plated surfaces being protected from the etchant by a coating of wax.

An electrical connection may now be soldered to the metal plating which overlies each of the annular raised portions, of which the inner one is the emitter connection while the outer one is the collector connection. The resulting three terminal device is a transistor and it may be connected in an external circuit including bias sources, a signal source, and a load. It is characterized by an emitter resistance of 400–800 ohms, a collector resistance of 1500–3000 ohms, a mutual impedance of 3000–6000 ohms, and an advantageously low base resistance of 10–20 ohms.

Various modifications of the structures described above will occur to those skilled in the art for affording low values of transistor base resistance without comparable reduction of the emitter resistance or of the collector resistance.

What is claimed is:

1. A circuit element which comprises a block of semiconductive material, a base electrode making low resistance contact with a face of said block, an emitter electrode making rectifier contact with said face of said block and in close proximity to said base electrode, and a collector electrode making rectifier contact elsewhere on said block.

2. A circuit element as defined in claim 1, wherein the base electrode overlies a substantial fraction of the area of the block with which it is in contact.

3. A circuit element as defined in claim 1, wherein the emitter electrode is a metal point making contact with the block face over a minute area and wherein said minute area is separated from the nearest boundary of said base electrode by not more than twice the smallest dimension of said minute area.

4. A circuit element as defined in claim 1, wherein the emitter electrode is a metal wire of cylindrical cross-section having one end beveled to form a chisel edge, said edge engaging the face of the semiconductor block with the beveled portion overhanging the base electrode and out of contact therewith.

5. A circuit element as defined in claim 1, wherein the emitter electrode makes contact with the face of the block over a minute area of substantially elliptical form, the major axis of the ellipse lying parallel with an edge of the base electrode.

6. A circuit element as defined in claim 5, wherein the separation between the base electrode and the emitter contact area is not greater than twice the minor axis of the ellipse.

7. A circuit element which comprises a block of semiconductive material having a recess in one face thereof, a base electrode substantially filling said recess and making low resistance contact with the body of the block, an emitter electrode making rectifier contact with the unrecessed portion of said block face and in close proximity to said recess, and a collector electrode making rectifier contact elsewhere with the unrecessed portion of said block face.

8. A circuit element as defined in claim 7 wherein the exposed surface of said base electrode is coplanar with the unrecessed portion of said block face.

9. A circuit element comprising a disc of semiconductive material having a thin central portion, a metal film electrode covering substantially one semicircular half of one face of said disc, an edge of said film coinciding substantially with a diameter of said disc, a second electrode making contact with the uncovered thin part of the disc at a point spaced from said edge by a distance not more than twice the diameter of said point contact, and a third electrode making point contact with the opposite face of the disc and collinearly with the second electrode.

10. A circuit element comprising a disc of semiconductive material having a thin central portion, a metal film electrode making low resistance contact with substantially the whole of one face of said disc with the exception of a small central hole, a second electrode making contact with the thin portion of the disc in the center of the hole, and a third electrode making contact with the opposite face of the disc and collinear with the second electrode.

11. A circuit element as defined in claim 10, wherein the second electrode makes point contact with a minute area of the semiconductor material, and wherein the linear dimensions of the hole in the film electrode are not more than twice the linear dimensions of the contact area.

12. A circuit element which comprises a block of semiconductor material having on one surface thereof a first, a second, and a third raised portion, the second raised portion lying between the first and the third and being spaced from the first by a mil or less and from the second by a mil or more and an electrode connected to each of said raised portions.

13. A circuit element as defined in claim 12, wherein the three raised portions are concentrically arranged.

14. A circuit element as defined in claim 12, wherein the second and the third raised portions are of conductivity type opposite to that of the body of the block and are separated therefrom by high resistance barriers.

15. A circuit element which comprises a block of semiconductor material of which the body is of one conductivity type and having on one face thereof two concentrically arranged annular zones of semiconductor material of conductivity type opposite to that of the body, an electrode connected to each of said zones, and another electrode connected to the body.

16. A circuit element as defined in claim 15, wherein the zones of opposite conductivity type are formed by nuclear bombardment of the face of the block.

17. A circuit element which comprises a block of semiconductor material of which the body and a preassigned part of one face thereof are of one conductivity type, a zone of said face adjacent said preassigned part being of opposite conductivity type and separated from the main body by a high resistance barrier, a first narrow groove in said face cutting said barrier at a distance of the order of one mil from said preassigned part, and a second groove in said face cutting said barrier at a distance of the order of 10 mils from said first groove, a first electrode connected to said preassigned part, a second electrode connected to said zone on one side of said second groove, and a third electrode connected to said zone on the other side of said second groove.

18. A circuit element as defined in claim 17, wherein the zone of opposite conductivity type is formed by nuclear bombardment of the face of the block.

19. The method of fabricating a transistor block which comprises plating a face of a block of N-conductivity type semiconductor material with a metal, applying a protective mask to a preassigned part of said plated face, subjecting said face to nuclear bombardment, whereby the unmasked portion of said face is converted to P-conductivity type material to a depth dependent on the velocity of the bombarding particles, separated from the N-conductivity type material by a well-defined high resistance barrier, and cutting grooves into said block perpendicular to said face and to a depth exceeding the depth of the barrier, to form islands of P-conductivity material which are bounded by the barrier and the grooves.

ROBERT L. WALLACE, JR.

No references cited.